(12) United States Patent
Minamisawa et al.

(10) Patent No.: US 12,096,123 B2
(45) Date of Patent: Sep. 17, 2024

(54) OPTICAL UNIT WITH SHAKE CORRECTION FUNCTION

(71) Applicant: NIDEC SANKYO CORPORATION, Nagano (JP)

(72) Inventors: Shinji Minamisawa, Nagano (JP); Tsutomu Arai, Nagano (JP); Takeshi Sue, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 121 days.

(21) Appl. No.: 18/152,763

(22) Filed: Jan. 11, 2023

(65) Prior Publication Data

US 2023/0224589 A1 Jul. 13, 2023

(30) Foreign Application Priority Data

Jan. 13, 2022 (JP) ................................ 2022-003865

(51) Int. Cl.
*H04N 23/68* (2023.01)
*H02K 41/035* (2006.01)
*H04N 23/54* (2023.01)
*H04N 23/57* (2023.01)

(52) U.S. Cl.
CPC ....... *H04N 23/687* (2023.01); *H02K 41/0354* (2013.01); *H04N 23/54* (2023.01); *H04N 23/57* (2023.01)

(58) Field of Classification Search
CPC ....... H04N 23/687; H04N 23/54; H04N 23/57
See application file for complete search history.

(56) References Cited

U.S. PATENT DOCUMENTS

| 11,409,124 | B2 * | 8/2022 | Sue | ........................... G02B 7/02 |
| 11,463,607 | B2 * | 10/2022 | Moon | ................ H04N 23/6812 |
| 11,493,779 | B2 * | 11/2022 | Minamisawa | ........... G03B 5/00 |
| 2020/0310152 | A1 * | 10/2020 | Minamisawa | ........ H02K 11/215 |
| 2021/0041714 | A1 * | 2/2021 | Sue | ........................... G02B 7/02 |
| 2021/0218866 | A1 * | 7/2021 | Moon | .................. G02B 27/646 |

FOREIGN PATENT DOCUMENTS

JP 2020160370 10/2020

* cited by examiner

*Primary Examiner* — Nicholas G Giles
(74) *Attorney, Agent, or Firm* — JCIPRNET

(57) ABSTRACT

In an optical unit with a shake correction function, a frame-shaped holder to which a camera module is fixed to an inner periphery being structured of a metal portion formed of a metal material, and a resin portion formed of a resin material and integrated with the metal portion by insert molding. The metal portion includes magnet fixing portions formed of a magnetic material and to which a driving magnet is fixed, and spherical body contact portions in contact with a spherical body made of metal and serving as a fulcrum for pivotal movement of the holder.

6 Claims, 7 Drawing Sheets

OPTICAL UNIT WITH SHAKE CORRECTION FUNCTION

CROSS REFERENCE TO RELATED APPLICATION

The present invention claims priority under 35 U.S.C. § 119 to Japanese Application No. 2022-003865 filed Jan. 13, 2022, and the entire content of which is incorporated herein by reference.

BACKGROUND

Field of the Invention

At least an embodiment of the present invention relates to an optical unit with a shake correction function to be mounted in a mobile device or the like.

Description of the Related Documents

Conventionally, optical units with a shake correction function mounted in a mobile device or the like have been known (see, for example, Japanese Patent Laid-Open No. 2020-160370, JPA 2020-160370). The optical unit with a shake correction function described in JPA 2020-160370 includes a movable body having an optical module, a gimbal frame that holds the movable body to be pivotally movable, a fixed body that holds the gimbal frame to be pivotally movable, and a shake correction drive mechanism that oscillates the movable body with respect to the fixed body. The movable body is pivotally movable with respect to the gimbal frame around a first axis orthogonal to an optical axis of the optical module. The gimbal frame is pivotally movable with respect to the fixed body around a second axis orthogonal to the optical axis and the first axis.

In the optical unit with a shake correction function described in JPA 2020-160370, the movable body includes a holder frame that holds the optical module. The holder frame is formed of a resin material. The shake correction drive mechanism includes a driving magnet to be fixed to the holder frame, and a driving coil to be fixed to the fixed body. A magnet placement concave portion in which the driving magnet is disposed is formed in the holder frame. Since the holder frame is made of resin, a plate-shaped yoke member is disposed in the magnet placement concave portion.

Also, in the optical unit with a shake correction function described in JPA 2020-160370, a first fulcrum portion serving as a fulcrum for pivotal movement of the movable body with respect to the gimbal frame is disposed at a diagonal position on the first axis of the movable body. The first fulcrum portion includes a first spherical body made of metal and disposed between the gimbal frame and the holder frame. Since it is difficult to fix the first spherical body made of metal and formed into a spherical shape to the holder frame made of resin with a predetermined fixing strength, the first fulcrum portion includes a first thrust receiving member made of metal to which the first spherical body is fixed and which is fixed to the holder frame.

In the optical unit with a shake correction function described in JPA 2020-160370, the holder frame is formed of a resin material. Therefore, in this optical unit with a shake correction function, it is necessary to increase the thickness of the holder frame in a radial direction of the optical module in order to secure the strength of the holder frame. However, when the thickness of the holder frame in the radial direction of the optical module is increased, the holder frame may become larger in the radial direction of the optical module, and consequently, the optical unit with a shake correction function may become larger in the radial direction of the optical module.

In view of the above, at least an embodiment of the present invention is to provide, in an optical unit with a shake correction function and including a holder to which a camera module is fixed on an inner periphery, an optical unit with a shake correction function capable of downsizing a holder in a radial direction of a camera module, while securing the strength of the holder.

SUMMARY

An optical unit with a shake correction function according to at least an embodiment of the present invention includes: a movable body including a camera module; an intermediate member, configured to hold the movable body to be pivotally movable; a fixed body, configured to hold the intermediate member to be pivotally movable; a magnet drive mechanism, configured to pivotally move the movable body with respect to the fixed body, so that an optical axis of the camera module is inclined in any direction; a first fulcrum portion, configured to serve as a fulcrum for pivotal movement of the movable body with respect to the intermediate member; and a second fulcrum portion, configured to serve as a fulcrum for pivotal movement of the intermediate member with respect to the fixed body. The movable body is configured to be pivotally movable with respect to the intermediate member around a first crossing direction intersecting an optical axis of the camera module, as an axis direction in pivotal movement. The intermediate member is configured to be pivotally movable with respect to the fixed body around a second crossing direction intersecting the first crossing direction and intersecting an optical axis of the camera module, as an axis direction in pivotal movement. The first fulcrum portion is disposed at both ends of the intermediate member in the first crossing direction. The movable body includes a frame-shaped holder to which the camera module is fixed on an inner periphery. The intermediate member includes two arm portions constituting end portions of the intermediate member in the first crossing direction. The magnet drive mechanism includes a driving magnet to be fixed to the holder, and a driving coil to be fixed to the fixed body. The first fulcrum portion includes a spherical body disposed between the arm portion and the holder. The holder is structured of a metal portion formed of a metal material, and a resin portion formed of a resin material and integrated with the metal portion by insert molding. The metal portion includes a magnet fixing portion formed of a magnetic material, and to which the driving magnet is fixed, and a spherical body contact portion in contact with the spherical body.

In the optical unit with a shake correction function according to at least an embodiment of the present invention, the frame-shaped holder to which the camera module is fixed on the inner periphery is structured of the metal portion formed of a metal material, and the resin portion formed of a resin material and integrated with the metal portion by insert molding. Therefore, at least an embodiment of the present invention makes it possible to reduce the thickness of the holder in the radial direction of the camera module, while securing the strength of the holder by the operation of the metal portion. Thus, at least an embodiment of the present invention makes it possible to downsize the holder in the radial direction of the camera module, while securing the strength of the holder.

Further, in at least an embodiment of the present invention, the metal portion is structured of the magnet fixing portion formed of a magnetic material and to which the driving magnet is fixed, and the spherical body contact portion in contact with the spherical body. Therefore, in at least an embodiment of the present invention, it is not necessary to provide a yoke member and a first thrust receiving member as in the optical unit with a shake correction function described in JPA 2020-160370. Thus, at least an embodiment of the present invention makes it possible to downsize the optical unit with a hake correction function by simplifying a configuration of the optical unit with a shake correction function. Also, in at least an embodiment of the present invention, since a part of the holder serves as the resin portion formed of a resin material, the holder can be made lightweight, as compared with a case where the entirety of the holder is formed of a metal material, and consequently, the optical unit with a shake correction function can be made lightweight.

In at least an embodiment of the present invention, both ends of the resin portion in an optical axis direction being a direction of an optical axis of the camera module may be disposed outside in the optical axis direction with respect to both ends of the metal portion in the optical axis direction. In this configuration, when the holder moves excessively in the optical axis direction due to application of an impact, for example, such as dropping to the optical unit with a shake correction function, it becomes possible to prevent the metal portion from contacting another component constituting the optical unit with a shake correction function. Therefore, it becomes possible to prevent damage of another component when the holder moves excessively in the optical axis direction.

In at least an embodiment of the present invention, an outer end of the resin portion in a radial direction of the holder orthogonal to an optical axis direction being a direction of an optical axis of the camera module may be disposed outside in a radial direction of the holder with respect to an outer end of the metal portion in a radial direction of the holder. In this configuration, when the holder moves excessively in the radial direction due to application of an impact, for example, such as dropping to the optical unit with a shake correction function, it becomes possible to prevent the metal portion from contacting another component constituting the optical unit with a shake correction function. Therefore, it becomes possible to prevent damage of another component when the holder moves excessively in the radial direction.

In at least an embodiment of the present invention, for example, an outer shape of the holder when viewed from an optical axis direction being a direction of an optical axis of the camera module is a square shape or a rectangular shape. The magnet fixing portion is disposed on two adjacent sides of four sides of the holder whose outer shape is a square shape or a rectangular shape, when viewed from the optical axis direction. The spherical body contact portion is disposed at two corner portions disposed on one of diagonal lines among four corner portions of the holder whose outer shape is a square shape or a rectangular shape, when viewed from the optical axis direction.

In at least an embodiment of the present invention, one of the two spherical body contact portions may be disposed between the two magnet fixing portions in a peripheral direction of the holder, and may be formed integrally with the two magnet fixing portions. This configuration makes it easy to handle a component when manufacturing the holder, as compared with a case where the two magnet fixing portions and the spherical body contact portion are formed separately.

In at least an embodiment of the present invention, the intermediate member may be a plate spring. The arm portion may be disposed on an inner periphery of the holder, and urge the spherical body toward the holder. The holder may be structured of a first holder portion and a second holder portion divided on the other diagonal line where the spherical body contact portion is not disposed, when viewed from the optical axis direction. The first holder portion and the second holder portion being formed separately may be fixed to each other.

In a case where the entirety of the frame-shaped holder is formed as a single unit by insert molding, it is necessary to dispose the two arm portions on the inner periphery of the holder in a state that the arm portions are elastically deformed up to the inner periphery of the holder, when the two arm portions that urge the spherical body toward the holder is disposed on the inner periphery of the holder. Therefore, when the optical unit with a shake correction function is downsized, and the holder and the intermediate member are downsized, it becomes difficult to dispose the two arm portions on the inner periphery of the holder. However, this configuration makes it possible to dispose the two arm portions on the inner periphery of the holder by fixing the first holder portion and the second holder portion to each other in a state that the two arm portions are disposed between the separately formed first holder portion and second holder portion. Therefore, it becomes easy to dispose the two arm portions on the inner periphery of the holder.

As described above, at least an embodiment of the present invention makes it possible to, in an optical unit with a shake correction function and including a holder to which a camera module is fixed on an inner periphery, downsize the holder in the radial direction of the camera module, while securing the strength of the holder.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

In the following, embodiments according to the present invention are described with reference to the drawings.

Overall Configuration of Optical Unit with Shake Correction Function

Figure 1:
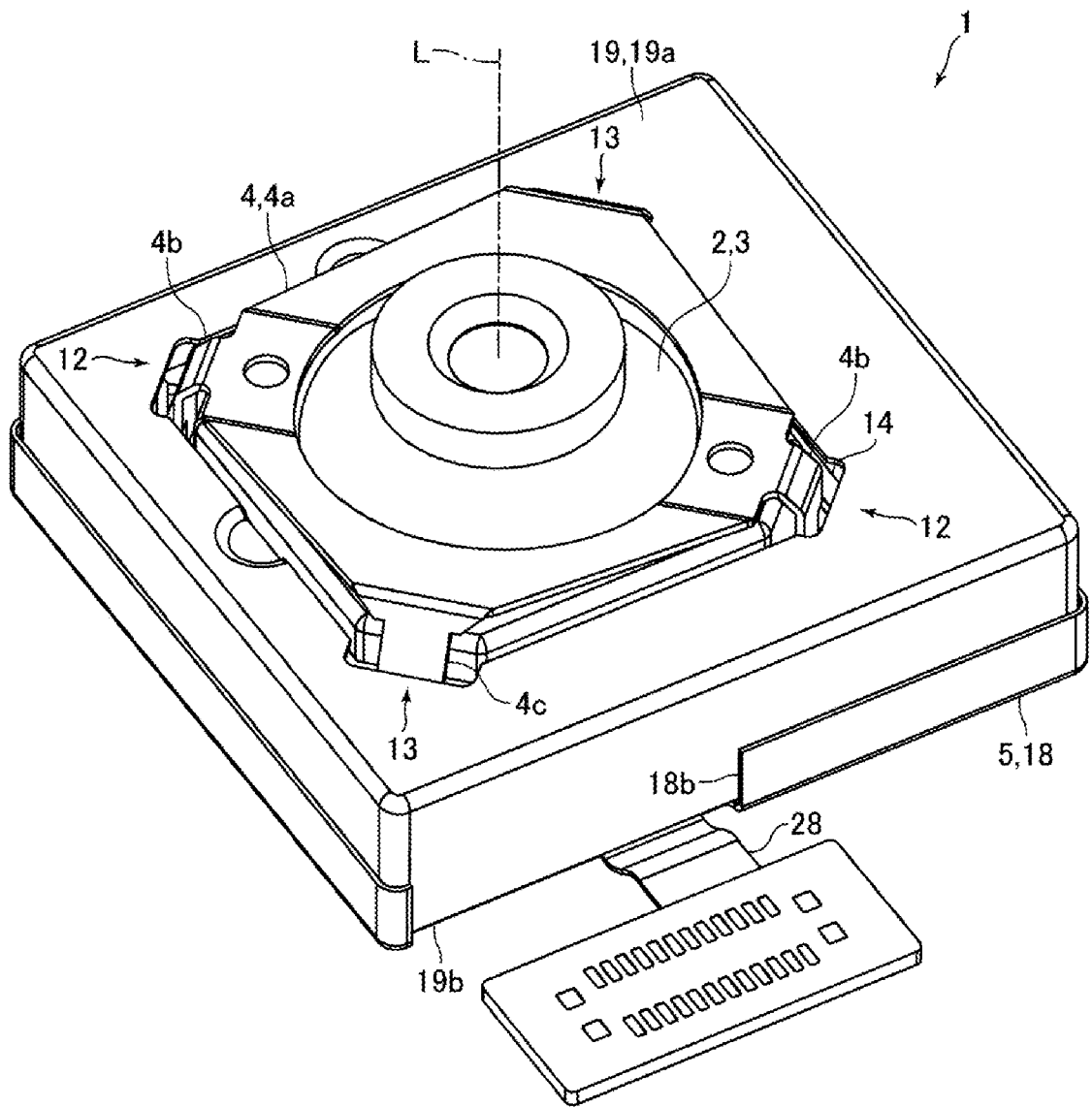
FIG. 1 is a perspective view of an optical unit with a shake correction function according to an embodiment of the present invention.
Figure 1:
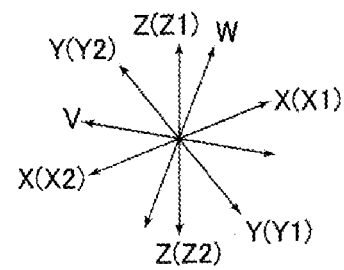
Figure 2:
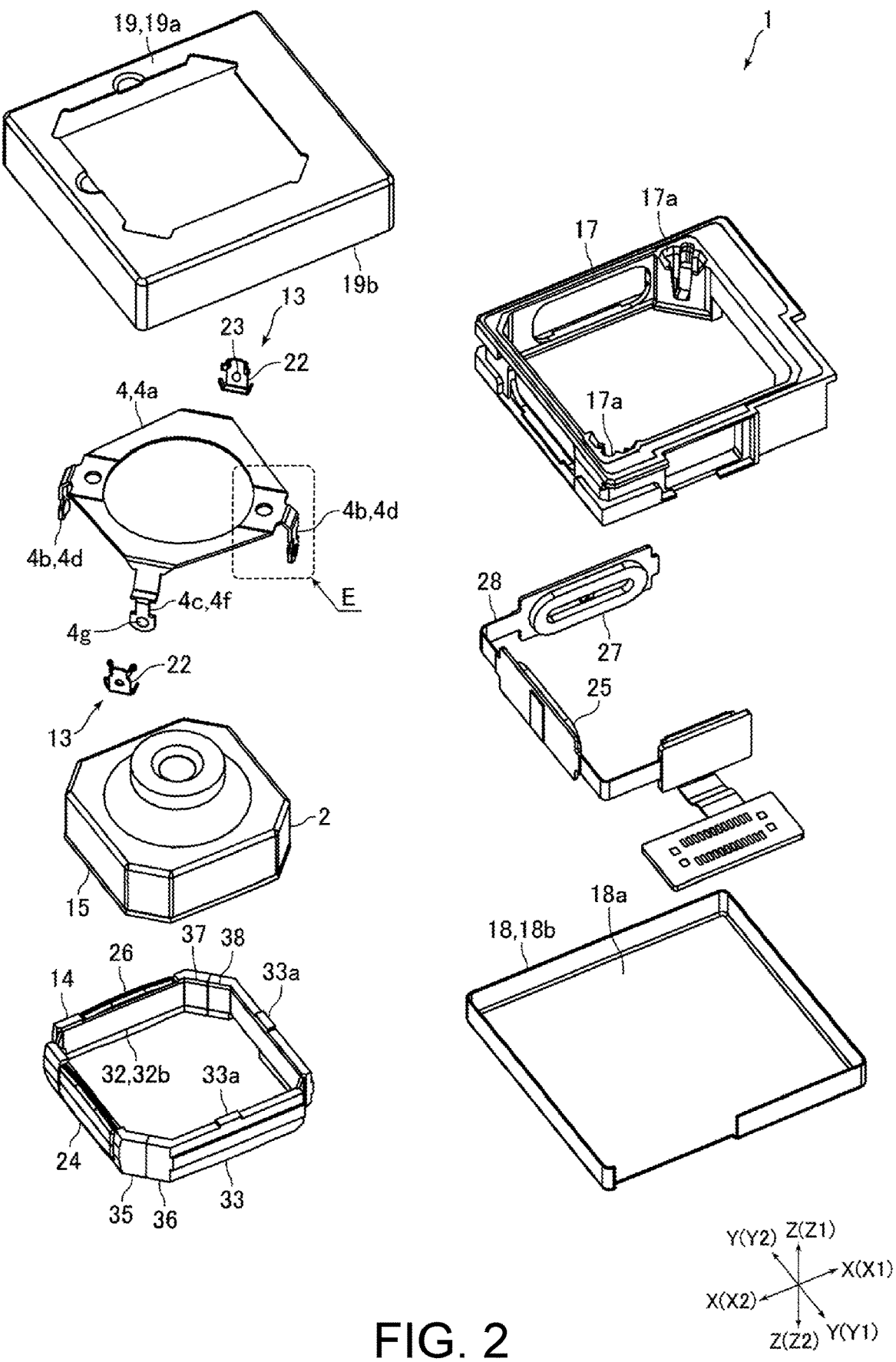
FIG. 2 is an exploded perspective view of the optical unit with a shake correction function illustrated in FIG. 1.
Figure 3:
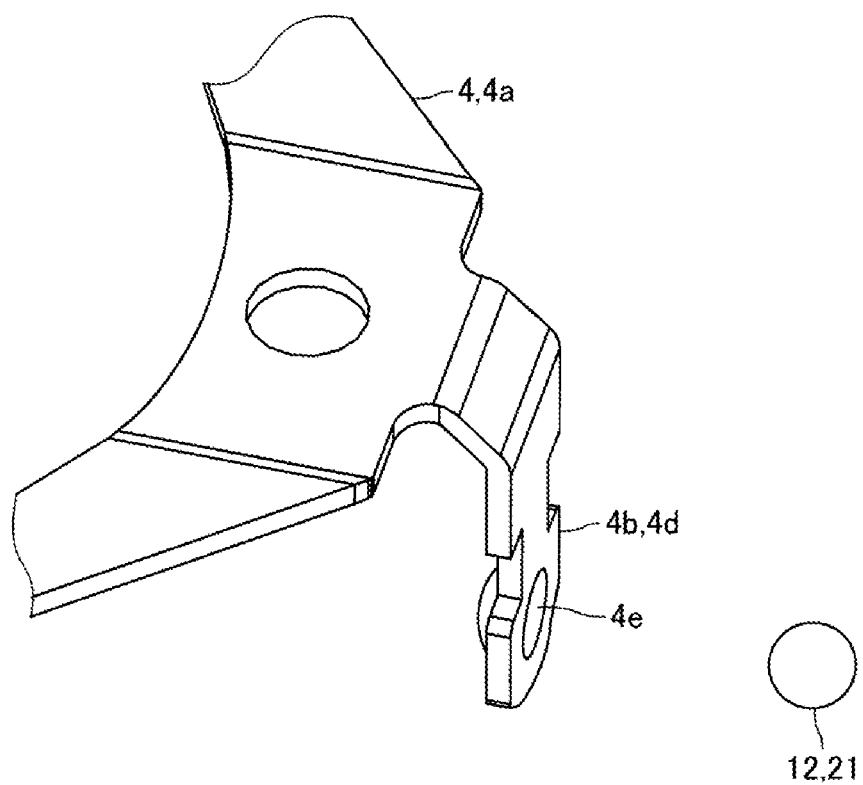
FIG. 3 is an enlarged view illustrating a configuration of a portion E in FIG. 2.
Figure 4:
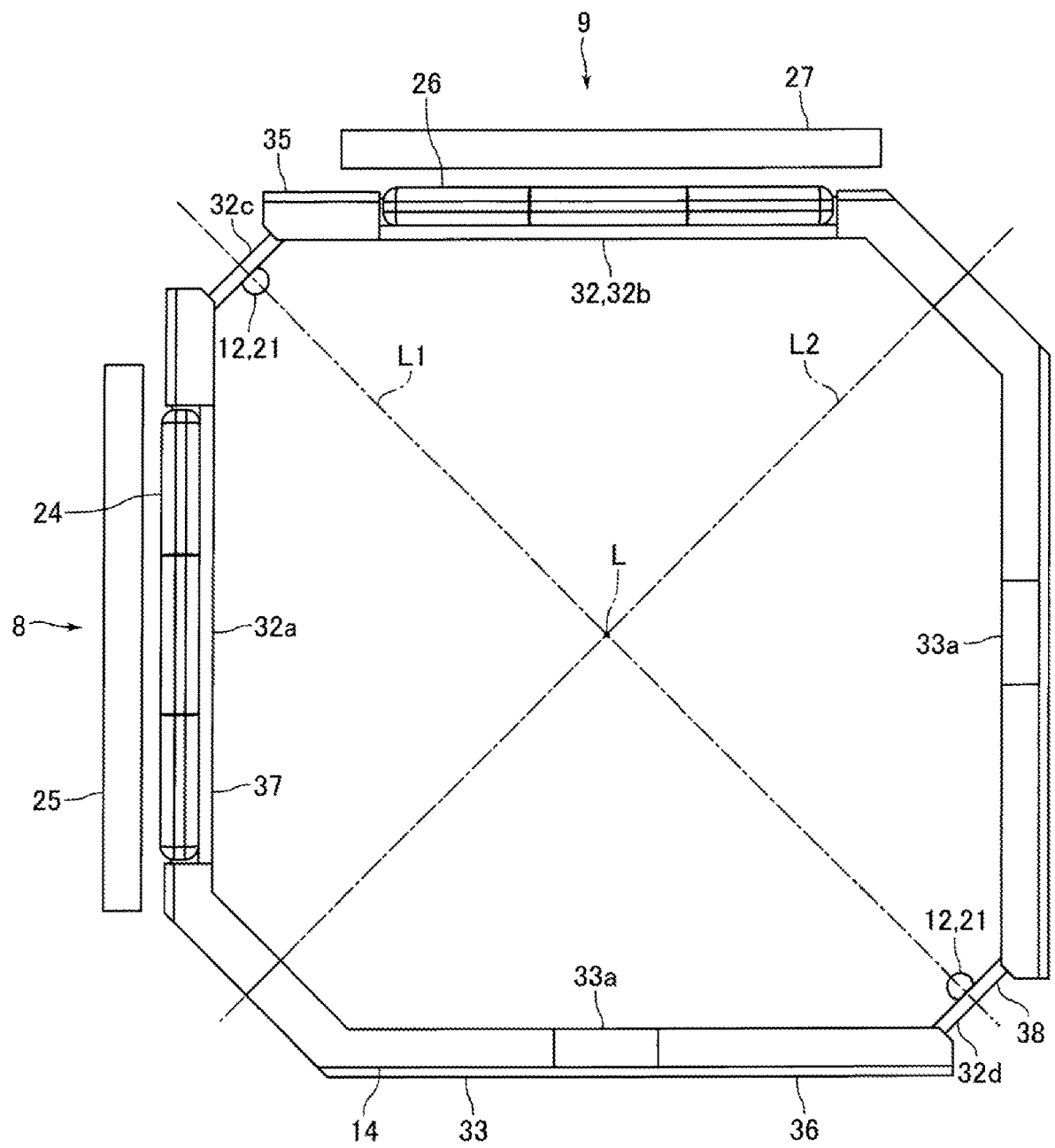
FIG. 4 is a plan view illustrating a state in which a holder, a magnet drive mechanism, and a spherical body illustrated in FIG. 2 are taken out.

FIG. 1 is a perspective view of an optical unit 1 with a shake correction function according to an embodiment of the present invention. FIG. 2 is an exploded perspective view of the optical unit 1 with a shake correction function illustrated in FIG. 1. FIG. 3 is an enlarged view illustrating a configuration of a portion E in FIG. 2. FIG. 4 is a plan view illustrating a state in which a holder 14, magnet drive mechanisms 8 and 9, and a spherical body 21 illustrated in FIG. 2 are taken out.

In the following description, as illustrated in FIG. 1 and the like, each of three directions orthogonal to one another is referred to as an X direction, a Y direction, and a Z direction, and the X direction is referred to as a left-right direction, the Y direction is referred to as a front-rear direction, and the Z direction is referred to as an up-down direction. A side corresponding to an X1 direction in FIG. 1 and the like, which is one side in the left-right direction, is referred to as a "right" side, a side corresponding to an X2 direction in FIG. 1 and the like, which is the opposite side in the left-right direction, is referred to as a "left" side, a side corresponding to a Y1 direction in FIG. 1 and the like, which is one side in the front-rear direction, is referred to as a "front" side, a side corresponding to a Y2 direction in FIG. 1 and the like, which is the opposite side in the front-rear direction, is referred to as a "rear" side, a side corresponding to a Z1 direction in FIG. 1 and the like, which is one side in the up-down direction, is referred to as an "upper" side, and a side corresponding to a Z2 direction in FIG. 1 and the like, which is the opposite side in the up-down direction, is referred to as a "lower" side.

The optical unit 1 with a shake correction function (hereinafter, referred to as the "optical unit 1") according to the present embodiment is a compact and thin unit to be mounted in a mobile device, for example, such as a smartphone, and includes a camera module 2 having a taking lens and an imaging element. The optical unit 1 is provided with a shake correction function for avoiding disturbance in a captured image in a case where shake occurs at the time of photographing. The optical unit 1 is formed into a thin, flat, and parallelepiped shape as a whole. The optical unit 1 according to the present embodiment is formed in such a way that a shape when viewed from an optical axis direction, which is a direction of an optical axis L of the camera module 2, is a square shape. Four side surfaces of the optical unit 1 are in parallel to a ZX plane defined by the left-right direction and the up-down direction, and a YZ plane defined by the front-rear direction and the up-down direction.

The optical unit 1 includes a movable body 3 (see FIG. 1) having the camera module 2, an intermediate member 4 that holds the movable body 3 to be pivotally movable, and a fixed body 5 (see FIG. 1) that holds the intermediate member 4 to be pivotally movable. The movable body 3 is pivotally movable with respect to the intermediate member 4 around a first crossing direction (direction V in FIG. 1 and the like) intersecting the optical axis L of the camera module 2, as an axis direction in pivotal movement. In other words, the movable body 3 is pivotally movable with respect to the intermediate member 4 around a first axis L1 (see FIG. 4), in which the first crossing direction is an axis direction. The first crossing direction according to the present embodiment is orthogonal to the optical axis L.

The intermediate member 4 is pivotally movable with respect to the fixed body 5 around a second crossing direction (W direction in FIG. 1 and the like) intersecting the first crossing direction and intersecting the optical axis L of the camera module 2, as an axis direction in pivotal movement. In other words, the intermediate member 4 is pivotally movable with respect to the fixed body 5 around a second axis L2 (see FIG. 4) in which the second crossing direction is an axis direction. In the present embodiment, the second crossing direction is orthogonal to the first crossing direction. In this way, a two-axis gimbal mechanism is configured between the movable body 3 and the fixed body 5.

In the present embodiment, when no electric current is supplied to driving coils 25 and 27 to described later, the movable body 3 is disposed at a predetermined reference position, and the optical axis L of the camera module 2 is disposed at a predetermined reference position. When the movable body 3 is disposed at the reference position, and the optical axis L of the camera module 2 is present at the reference position, the optical axis direction of the camera module 2 coincides with the up-down direction. Note that, an inclination of the optical axis L of the camera module 2 with respect to the up-down direction when shake correction is performed is small. Therefore, the optical axis direction of the camera module 2 substantially coincides with the up-down direction.

Further, when the movable body 3 is disposed at the reference position, the second crossing direction (W direction) is orthogonal to the optical axis L. In other words, when the movable body 3 is disposed at the reference position and is not pivotally movable with respect to the intermediate member 4, the second crossing direction is orthogonal to the optical axis L. On the other hand, when the movable body 3 is pivotally movable with respect to the intermediate member 4, the second crossing direction intersects the optical axis L, but does not intersect the optical axis L at a right angle. The second crossing direction (W direction) when viewed from above is displaced with respect to the front-rear direction by about 45° clockwise in FIG. 4.

The optical unit 1 includes the magnet drive mechanisms 8 and 9 for pivotally moving the movable body 3 with respect to the fixed body 5 in such a way that the optical axis L of the camera module 2 is inclined in any direction (see FIG. 4). The optical unit 1 also includes a first fulcrum portion 12 serving as a fulcrum for pivotal movement of the movable body 3 with respect to the intermediate member 4, and a second fulcrum portion 13 serving as a fulcrum for pivotal movement of the intermediate member 4 with respect to the fixed body 5. The first fulcrum portion 12 is disposed at both ends of the intermediate member 4 in the first crossing direction, and the second fulcrum portion 13 is disposed at both ends of the intermediate member 4 in the second crossing direction.

The movable body 3 is formed into a flat and substantially parallelepiped shape with a thin thickness in the optical axis direction as a whole. The movable body 3 includes the frame-shaped holder 14 to which the camera module 2 is fixed on the inner periphery. The holder 14 is formed into a square frame shape, and an outer shape of the holder 14 when viewed from the optical axis direction is a square shape. Further, when the movable body 3 is disposed at the reference position, two of four sides constituting an outer peripheral surface of the holder 14 whose outer shape is a square shape are parallel to the front-rear direction, and the remaining two sides are parallel to the front-right direction. A specific configuration of the holder 14 is described later.

The camera module 2 is fixed to an inner peripheral surface of the holder 14 in such a way that the holder 14 covers an outer periphery of a lower end of the camera module 2. As described above, the camera module 2 includes a lens and an imaging element. The imaging element is disposed at a lower end of the camera module 2, and a subject located on the upper side of the camera module 2 is photographed by the camera module 2. The camera module 2 includes a wiring substrate 15 on which the imaging element is mounted (see FIG. 2). The wiring substrate 15 is a rigid substrate such as a glass epoxy substrate. A flexible printed circuit board (not illustrated) is drawn from the wiring substrate 15.

As described above, an inclination of the optical axis L of the camera module 2 with respect to the up-down direction when shake correction is performed is small, and the optical axis direction of the camera module 2 approximately coincides with the up-down direction. Therefore, when it is assumed that one side in the optical axis direction of the camera module 2 (specifically, a side where a subject is located in the optical axis direction of the camera module 2) is a subject side, and the opposite side of the subject side (specifically, a side where the imaging element is disposed in the optical axis direction of the camera module 2) is an anti-subject side, the subject side approximately coincides with the upper side, and the anti-subject side approximately coincides with the lower side.

The intermediate member 4 is formed of a metal material such as stainless steel. Further, the intermediate member 4 is a plate spring formed by bending a metal plate having a spring property into a predetermined shape. The intermediate member 4 includes a base portion 4a disposed on the upper side with respect to the holder 14, two arm portions 4b extending from the base portion 4a toward both sides in the first crossing direction, and two arm portions 4c extending from the base portion 4a toward both sides in the second crossing direction. The base portion 4a is formed into a substantially square frame shape. An upper end of the camera module 2 is disposed on the inner periphery of the base portion 4a.

The arm portions 4b are connected to both ends of the base portion 4a in the first crossing direction. The arm portions 4b constitute end portions of the intermediate member 4 in the first crossing direction. The arm portions 4b are bent downwardly. A tip end portion 4d of the arm portion 4b is formed into a flat plate in which the first crossing direction is a thickness direction. The tip end portion 4d is disposed on the inner periphery of the holder 14. The tip end portion 4d is also disposed on the outer periphery of the camera module 2. A hemi-spherical concave portion 4e in which a part of the spherical body 21 to be described later and constituting the first fulcrum portion 12 is formed at a lower end of the tip end portion 4d (see FIG. 3). The concave portion 4e is recessed toward the inside in the first crossing direction.

The arm portions 4c are connected to both ends of the base portion 4a in the second crossing direction. The arm portions 4c constitute end portions of the intermediate member 4 in the second crossing direction. The arm portions 4c are bent downwardly. A tip end portion 4f of the arm portion 4c is formed into a flat plate in which the second crossing direction is a thickness direction. The tip end portion 4f is disposed on the outer periphery of the holder 14. The tip end portion 4f is also disposed in a placement hole 17a to be described later. A hemi-spherical concave portion 4g in which a part of a spherical body 23 to be described later and constituting a part of the second fulcrum portion 13 is formed in a lower end of the tip end portion 4f (see FIG. 2). The concave portion 4g is recessed toward the inside in the second crossing direction.

The fixed body 5 includes a frame-shaped case body 17 disposed on the outer periphery of the movable body 3 and the intermediate member 4, a cover member 18 that covers a lower surface of the case body 17, and a cover member 19 that covers a side surface and an upper surface of the case body 17. The intermediate member 4 is held by the case body 17 to be pivotally movable. The case body 17 is formed of a resin material. The case body 17 is formed into a flat rectangular cylindrical shape with openings at both ends in the up-down direction. The shape of the case body 17 when viewed from the up-down direction is a square frame shape.

When viewed from the up-down direction, two of four sides constituting an outer peripheral surface of the case body 17 whose outer shape is a square shape are parallel to the front-rear direction, and the remaining two sides are parallel to the left-right direction. The case body 17 is formed with the placement hole 17a in which a support member 22 to be described later and constituting a part of the second fulcrum portion 13 is disposed and fixed (see FIG. 2). The placement hole 17a is formed at both ends of the case body 17 in the second crossing direction. In other words, the placement hole 17a is formed at two positions, namely, at a left front end corner portion and at a right rear end corner portion of the case body 17.

The cover member 18 is formed into a bottomed rectangular cylindrical shape including a bottom portion 18a, which is formed into a square flat plate shape, and a cylindrical portion 18b of a rectangular cylindrical shape, which rises upwardly from the bottom portion 18a. An outer shape of the cover member 18 when viewed from the up-down direction is a square shape. Two of four sides constituting an outer peripheral surface of the cover member 18 whose outer shape is a square shape when viewed from the up-down direction are parallel to the front-rear direction, and the remaining two sides are parallel to the left-right direction. The bottom portion 18a constitutes a bottom surface of the optical unit 1. The cylindrical portion 18b covers the outer periphery of a lower end of a cylindrical portion 19b to be described later, and constituting a part of the cover member 19. The cylindrical portion 18b constitutes a part of a side surface of the optical unit 1.

The cover member 19 includes a flat plate-shaped cover portion 19a that covers an upper end surface of the case body 17, and the cylindrical portion 19b of a square cylindrical shape and extending downwardly from the cover portion 19a. The cover portion 19a is formed into a square frame shape. An outer shape of the cover member 19 when viewed from the up-down direction is a square shape. Two of four sides constituting an outer peripheral surface of the cover member 19 whose outer shape is a square shape when viewed from the up-down direction are parallel to the front-rear direction, and the remaining two sides are parallel to the left-right direction. A part of the camera module 2 and the intermediate member 4 is disposed on the inner periphery of the cover portion 19a. The cylindrical portion 19b covers the outer periphery of the case body 17. The cylindrical portion 19b constitutes a part of a side surface of the optical unit 1.

The first fulcrum portion 12 includes the spherical body 21 of a spherical shape disposed between the arm portion 4b and the holder 14. In the present embodiment, the spherical body 21 serves as the first fulcrum portion 12. The spherical body 21 is formed of a metal material. The spherical body 21 is fixed to the holder 14. A part of the spherical body 21 is disposed in the concave portion 4e of the arm portion 4b. The spherical body 21 is in contact with the concave portion 4e from the outside in the first crossing direction. The spherical body 21 is urged toward the holder 14 by a spring property of the arm portion 4b. In other words, the arm portion 4b urges the spherical body 21 toward the holder 14. Also, the arm portion 4b urges the spherical body 21 outwardly in the first crossing direction.

The second fulcrum portion 13 includes the support member 22 to be fixed to the fixed body 5, and the spherical body 23 (see FIG. 2) of a spherical shape and disposed between the arm portion 4c and the support member 22. The support member 22 is formed by bending a flat metal plate into a predetermined shape. The support member 22 is disposed in the placement hole 17a. The support member 22 is also fixed to the placement hole 17a. In other words, the support member 22 is fixed to the case body 17. The spherical body 23 is formed of a metal material. The spherical body 23 is fixed to the support member 22.

A part of the spherical body 23 is disposed in the concave portion 4g of the arm portion 4c. The spherical body 23 is in contact with the concave portion 4g from the outside in the second crossing direction. The support member 22 and the spherical body 23 are urged toward the case body 17 by a spring property of the second arm portion 4c. In other words, the second arm portion 4c urges the support member 22 and the spherical body 23 toward the case body 17. Also, the second arm portion 4c urges the support member 22 and the spherical body 23 outwardly in the second crossing direction.

The magnet drive mechanism 8 includes driving magnets 24 and driving coils 25 disposed opposite to each other in the left-right direction. The magnet drive mechanism 9 includes driving magnets 26 and driving coils 27 disposed opposite to each other in the front-rear direction. The driving magnets 24 and 26 are formed into a rectangular flat plate shape. The driving magnets 24 and 26 are fixed to the holder 14. The driving coils 25 and 27 are hollow core coils, for example, formed by winding a conducive wire in a hollow core manner.

The driving magnet 24 is fixed to a left surface of the holder 14. The driving coil 25 is disposed in a through-hole formed in a left surface portion of the case body 17. The driving coil 25 is also mounted on a flexible printed circuit board 28 (hereinafter referred to as an "FPC 28"). The magnet drive mechanism 8 pivotally moves the movable body 3 with respect to the fixed body 5 around an axis orthogonal to the optical axis L of the camera module 2 and parallel to the front-rear direction, as a center of pivotal movement.

The driving magnet 26 is fixed to a rear surface of the holder 14. The driving coil 27 is disposed in a through-hole formed in a rear surface portion of the case body 17. The driving coil 27 is also mounted on the FPC 28. The magnet drive mechanism 9 pivotally moves the movable body 3 with respect to the fixed body 5 around an axis orthogonal to the optical axis L of the camera module 2 and parallel to the left-right direction, as a center of pivotal movement. The FPC 28 is drawn along a rear surface, a left side surface, and a front surface of the case body 17. The FPC 28 is fixed to an outer peripheral surface of the case body 17. In other words, the driving coils 25 and 27 are fixed to the fixed body 5 via the FPC 28.

In the optical unit 1, when a change in inclination of the movable body 3 is detected by a predetermined detection mechanism for detecting a change in inclination of the movable body 3, electric current is supplied to at least either one of the driving coil 25 and the driving coil 27, based on a detection result of this detection mechanism, and shake is corrected. The magnet drive mechanism 8 and the magnet drive mechanism 9 pivotally move the movable body 3 with respect to the fixed body 5 around at least either one of the first axis L1 and the second axis L2, as a center of pivotal movement.

Configuration of Holder

Figure 5:
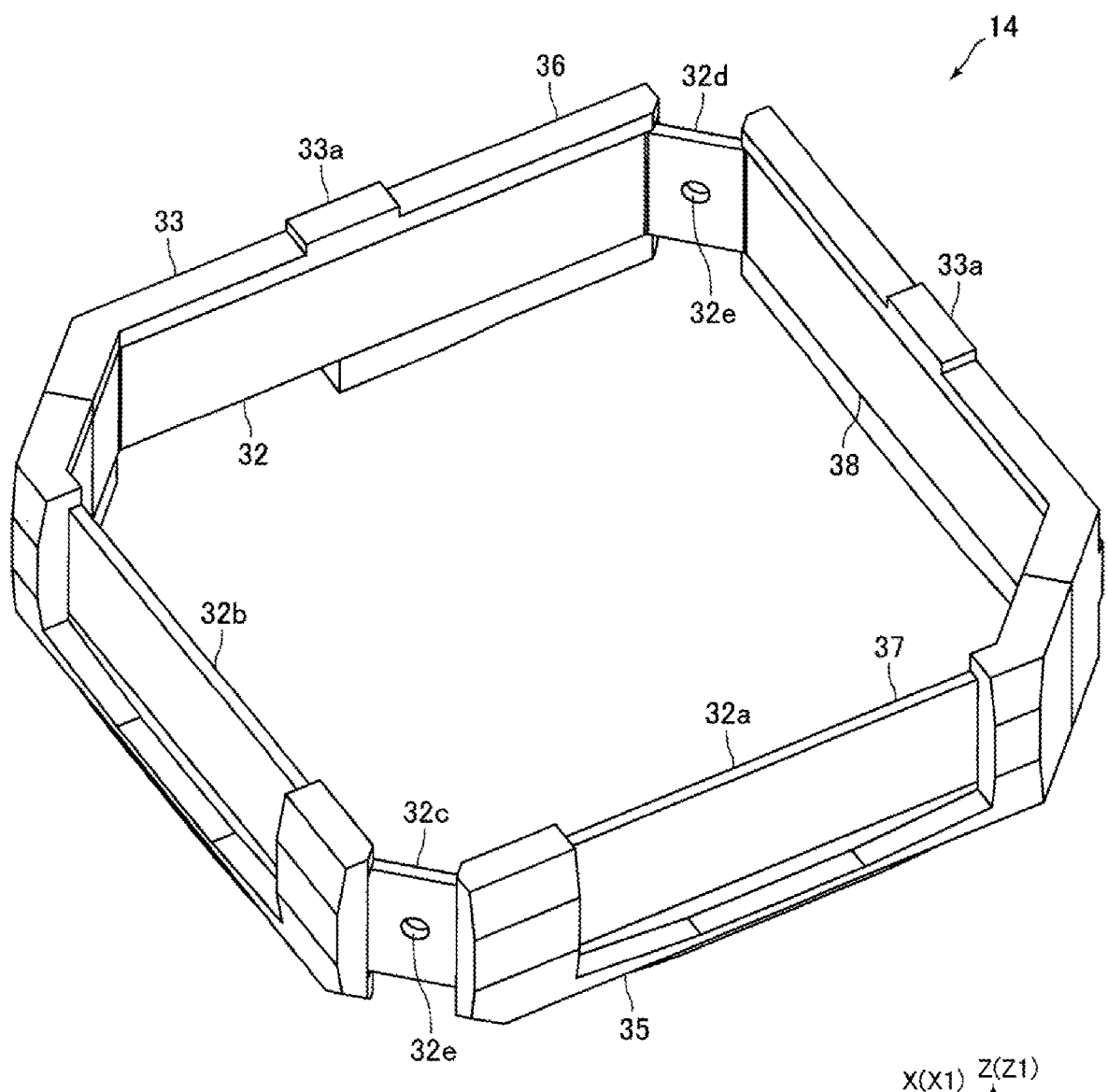
FIG. 5 is a perspective view illustrating the holder illustrated in FIG. 2 when viewed from another direction.
Figure 6:
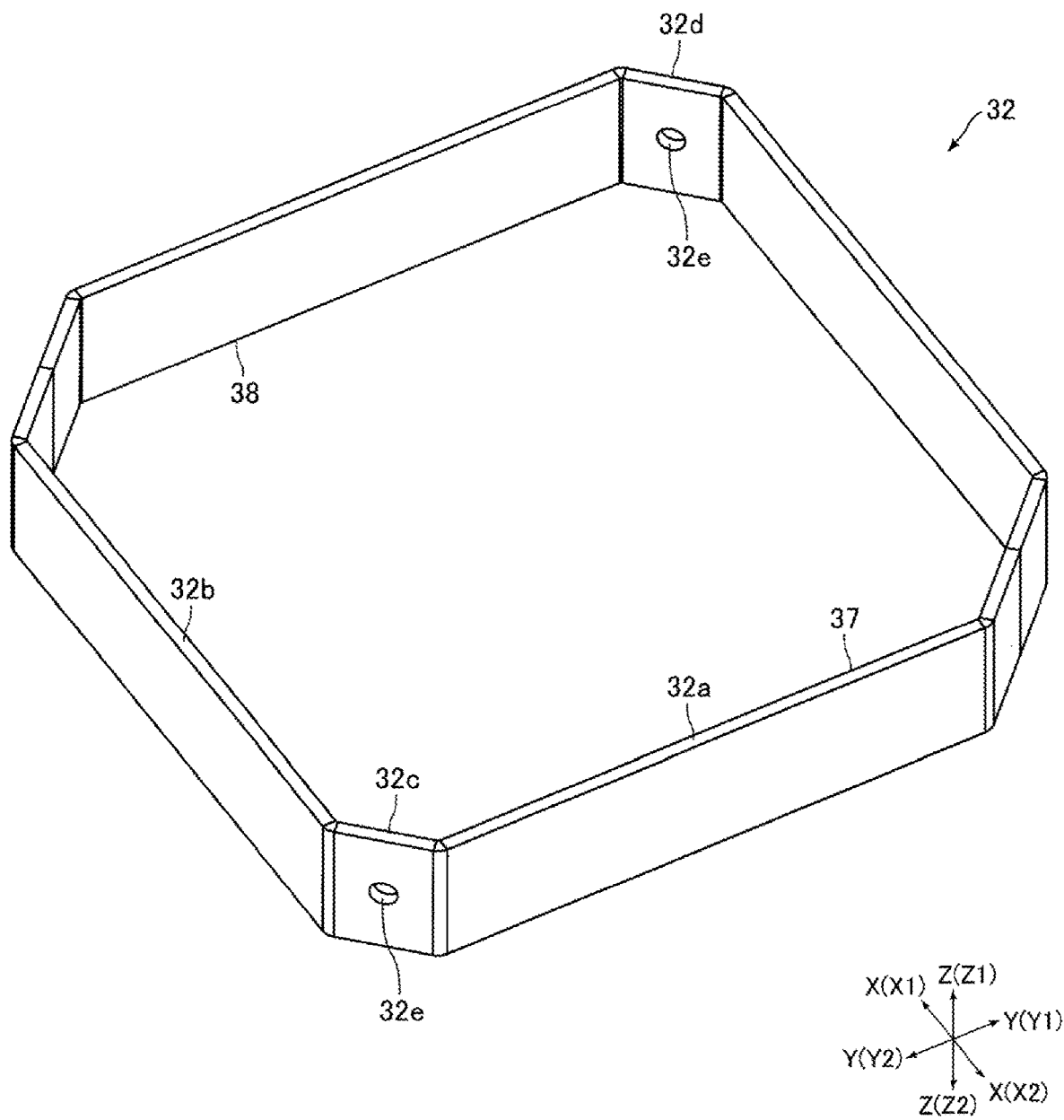
FIG. 6 is a perspective view of a metal portion illustrated in FIG. 5.
Figure 7:
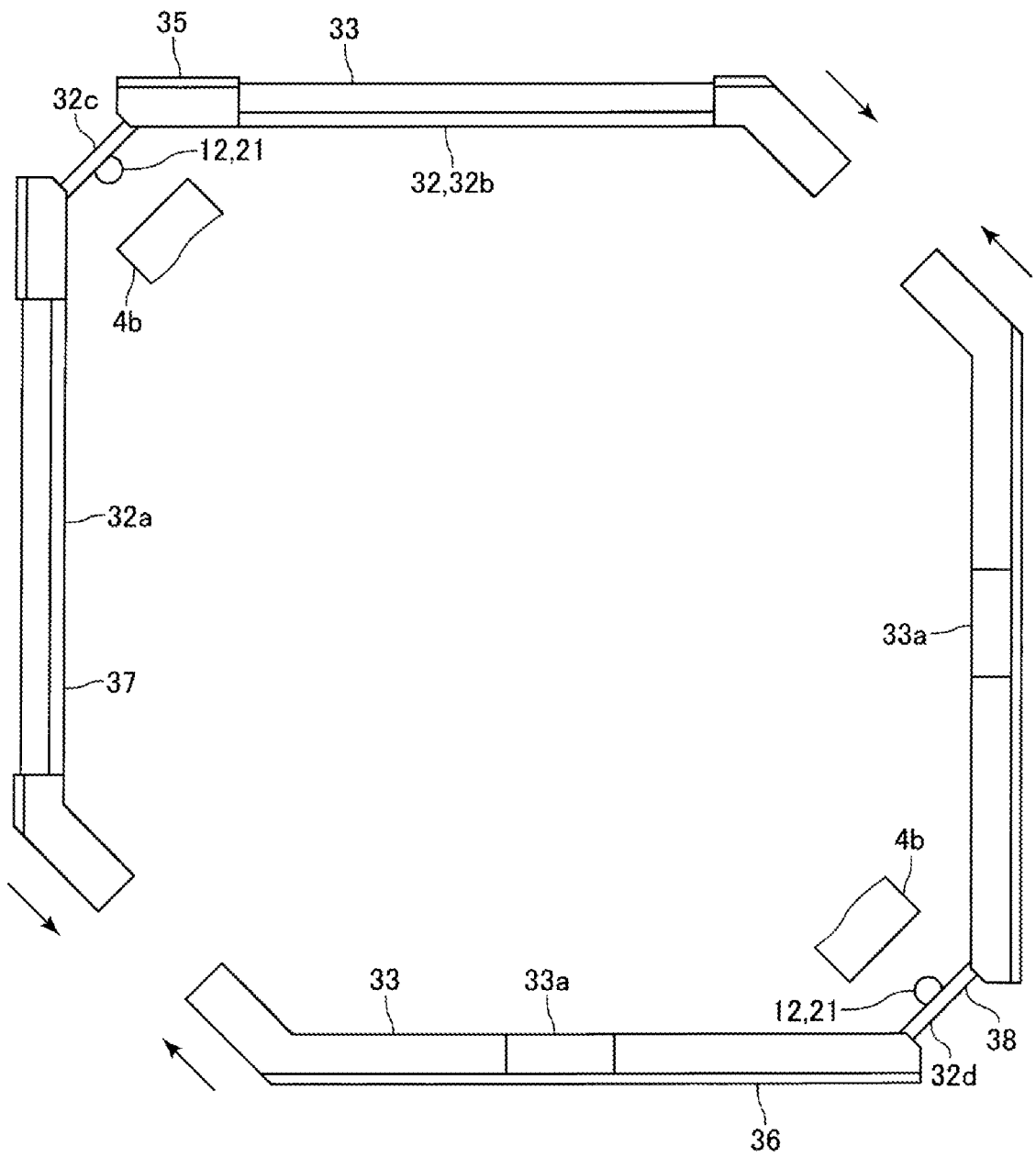
FIG. 7 is a plan view illustrating a state before a first holder portion and a second holder portion illustrated in FIG. 5 are fixed.

FIG. 5 is a perspective view of the holder 14 illustrated in FIG. 2 when viewed from another direction. FIG. 6 is a perspective view of a metal portion 32 illustrated in FIG. 5. FIG. 7 is a plan view illustrating a state before a first holder portion 35 and a second holder portion 36 illustrated in FIG. 5 are fixed.

As described above, an outer shape of the holder 14 when viewed from the optical axis direction is a square shape. In the present embodiment, as illustrated in FIG. 4, four corners of the holder 14 whose outer shape when viewed from the optical axis direction is a square shape are chamfered. The holder 14 is structured of the metal portion 32 formed of a metal material, and a resin portion 33 formed of a resin material and integrated with the metal portion 32 by insert molding. In other words, the holder 14 is structured of the metal portion 32, and the resin portion 33 integrated with the metal portion 32 by insert molding.

As illustrated in FIG. 6, the metal portion 32 is formed into a flat square cylindrical shape with openings at both ends in the optical axis direction. An outer shape of the metal portion 32 when viewed from the optical axis direction is a square shape. In the present embodiment, four corners of the metal portion 32 whose outer shape when viewed from the optical axis direction is a square shape are chamfered. Also, in the present embodiment, the entirety of the metal portion 32 is formed of a magnetic material. The metal portion 32 includes a magnet fixing portion 32a to which the driving magnet 24 is fixed, a magnet fixing portion 32b to which the driving magnet 26 is fixed, and spherical body contact portions 32c and 32d in contact with the spherical body 21.

As illustrated in FIGS. 4 to 6, a part of a left side portion of the holder 14 serves as the magnet fixing portion 32a, and a part of a rear side portion of the holder 14 serves as the magnet fixing portion 32b. In other words, the magnet fixing portions 32a and 32b are disposed on adjacent two sides of four sides of the holder 14 whose outer shape is a square shape when viewed from the optical axis direction. The magnet fixing portions 32a and 32b are formed into a flat plate shape. When the movable body 3 is disposed at a reference position, a thickness direction of the magnet fixing portion 32a coincides with the left-right direction, and a thickness direction of the magnet fixing portion 32b coincides with the front-rear direction.

Further, a left rear end corner portion of the holder 14 serves as the spherical body contact portion 32c, and a right front end corner portion of the holder 14 serves as the spherical body contact portion 32d. In other words, the spherical body contact portions 32c and 32d are disposed at two corner portions disposed on one of diagonal lines among four corner portions of the holder 14 whose outer shape is a square shape when viewed from the optical axis direction. Also, the spherical body contact portion 32c is disposed between the magnet fixing portion 32a and the magnet fixing portion 32b in a peripheral direction of the frame-shaped holder 14. In other words, the spherical body contact portion 32c of the two spherical body contact portions 32c and 32d is disposed between the two magnet fixing portions 32a and 32b in the peripheral direction of the holder 14.

The spherical body contact portions 32c and 32d are formed into a flat plate shape in which the first crossing direction is a thickness direction. A through-hole 32e in which a part of the spherical body 21 is disposed is formed in a center portion of the spherical body contact portions 32c and 32d. The through-hole 32e plays a function of positioning the spherical body 21. The spherical body 21 is fixed to the spherical body contact portions 32c and 32d from the inside in the first crossing direction, and a major part of the spherical body 21 is disposed inside the spherical body contact portions 32c and 32d in the first crossing direction. The spherical body 21 is fixed to the spherical body contact portions 32c and 32d by welding, for example.

The resin portion 33 covers a part of the metal portion 32 from the outside in a radial direction of the holder 14, which is orthogonal to the optical axis direction, and covers a part of the metal portion 32 from both sides in the optical axis direction. Specifically, the resin portion 33 covers a portion of the metal portion 32 except for the magnet fixing portion 32a and 32b, and the spherical body contact portions 32c and 32d from the outside in the radial direction of holder 14. The resin portion 33 also covers a portion of the metal portion 32 except for the magnet fixing portions 32a and 32b, and the spherical body contact portions 32c and 32d from the subject side (upper side), and covers a portion of the metal portion 32 except for the spherical body contact portions 32c and 32d from the anti-subject side (lower side). Note that, a flexible printed circuit board to be drawn from the wiring substrate 15 passes through the anti-subject side of a right side portion of the metal portion 32, and the anti-subject side of the metal portion 32 is not covered by the resin portion 33 at a position where the flexible printed circuit board passes through (see FIG. 5).

Both ends of the resin portion 33 in the optical axis direction are disposed outside in the optical axis direction with respect to both ends of the metal portion 32 in the optical axis direction. In other words, the subject-side end (upper end) of the resin portion 33 is disposed on the subject side with respect to the subject-side end (upper end) of the metal portion 32, and the anti-subject side end (lower end) of the resin portion 33 is disposed on the anti-subject side with respect to the anti-subject side end (lower end) of the metal portion 32. The outer end of the resin portion 33 in the radial direction of the holder 14 is disposed outside in the radial direction of the holder 14 with respect to the outer end of the metal portion 32 in the radial direction of the holder 14. In other words, the outer peripheral surface of the resin portion 33 is disposed on the outer periphery with respect to the outer peripheral surface of the metal portion 32.

The driving magnet 24 is fixed to a left surface of the magnet fixing portion 32a. The driving magnet 26 is fixed to a rear surface of the magnet fixing portion 32b. The driving magnet 24 to be fixed to the left surface of the magnet fixing portion 32a is positioned in the peripheral direction of the holder 14, and positioned on the anti-subject side by the resin portion 33. The driving magnet 26 to be fixed to the rear surface of the magnet fixing portion 32b is positioned in the peripheral direction of the holder 14, and positioned on the anti-subject side by the resin portion 33. In other words, the resin portion 33 plays a function of positioning the driving magnets 24 and 26.

An upwardly protruding convex portion 33a is formed on the resin portion 33 at a right side portion and a front side portion of the holder 14 where the driving magnets 24 and 26 are not disposed. The convex portion 33a to be formed on the resin portion 33 at the right side portion of the holder 14 is disposed at a center portion of the right side portion of the holder 14 in the front-rear direction, and the convex portion 33a to be formed on the resin portion 33 at the front side portion of the holder 14 is disposed at a center portion of the front side portion of the holder 14 in the left-right direction.

The convex portion 33a plays a function of regulating movement of the holder 14 toward a subject.

In addition, the holder 14 according to the present embodiment is structured of the first holder portion 35 and the second holder portion 36 divided on the other diagonal line (i.e., on a diagonal line connecting the right rear end corner portion and the left front end corner portion of the holder 14) on which the spherical body contact portions 32c and 32d are not disposed when viewed from the optical axis direction (see FIG. 7), and the separately formed first holder portion 35 and second holder portion 36 are fixed to each other. The metal portion 32 is structured of a first metal portion 37 and a second metal portion 38 divided on a diagonal line connecting the right rear end corner portion and the left front end corner portion of the holder 14. The first metal portion 37 and the second metal portion 38 are formed by bending a flat metal plate into a predetermined shape.

The first metal portion 37 constitutes a left side portion and a rear side portion of the metal portion 32, and the first metal portion 37 includes the magnet fixing portions 32a and 32b, and the spherical body contact portion 32c. In other words, the spherical body contact portion 32c is formed integrally with the two magnet fixing portions 32a and 32b. The first holder portion 35 is structured of the first metal portion 37 and the resin portion 33 integrated with the first metal portion 37 by insert molding. The first holder portion 35 constitutes a left side portion and a rear side portion of the holder 14.

The second metal portion 38 constitutes a right side portion and a front side portion of the metal portion 32, and the second metal portion 38 includes the spherical body contact portion 32d. The second holder portion 36 is structured of the second metal portion 38, and the resin portion 33 integrated with the second metal portion 38 by insert molding. The second holder portion 36 constitutes a right side portion and a front side portion of the holder 14.

The first holder portion 35 and the second holder portion 36 are fixed to each other at the right rear end corner portion and the left front end corner portion of the holder 14 by, for example, an adhesive agent. Alternatively, the first holder portion 35 and the second holder portion 36 are fixed to each other at the right rear end corner portion and the left front end corner portion of the holder 14, for example, by welding the first metal portion 37 and the second metal portion 38. For example, a concavo-convex portion for positioning is formed on the resin portion 33 of the first holder portion 35 and the resin portion 33 of the second holder portion 36 at the right rear end corner portion and the left front end corner portion of the holder 14.

In the present embodiment, before the first holder portion 35 and the second holder portion 36 are fixed to each other, the spherical body 21 is fixed to the spherical body contact portions 32c and 32d. Also, in the present embodiment, the first holder portion 35 and the second holder portion 36 are fixed to each other in a state that the two arm portions 4b of the intermediate member 4 are disposed between the separately formed first holder portion 35 and second holder portion 36 (see FIG. 7).

As described above, in the present embodiment, the holder 14 is structured of the metal portion 32 formed of a metal material, and the resin portion 33 formed of a resin material and integrated with the metal portion 32 by insert molding. Therefore, in the present embodiment, it becomes possible to reduce the thickness of the holder 14 in the radial direction of the camera module 2, while securing the strength of the holder 14 by the operation of the metal portion 32. Thus, in the present embodiment, it becomes possible to downsize the holder 14 in the radial direction of the camera module 2, while securing the strength of the holder 14. In addition, in the present embodiment, since a part of the holder 14 serves as the resin portion 33, it becomes possible to make the holder 14 lightweight, as compared with a case where the entirety of the holder 14 is formed of a metal material, and consequently, it becomes possible to make the optical unit 1 lightweight.

In the present embodiment, the metal portion 32 includes the magnet fixing portions 32a and 32b to which the driving magnets 24 and 26 are fixed. Further, in the present embodiment, the metal portion 32 is formed of a magnetic material. Therefore, in the present embodiment, it is not necessary to provide a yoke member as in the optical unit with a shake correction function described in the above-described JPA 2020-160370. Also, in the present embodiment, the metal portion 32 includes the spherical body contact portions 32c and 32d to which the spherical body 21 made of metal is fixed, and it is not necessary to provide a first thrust receiving member as in the optical unit with a shake correction function described in the above-described JPA 2020-160370. Therefore, in the present embodiment, it becomes possible to downsize the optical unit 1 by simplifying a configuration of the optical unit 1. Note that, in the present embodiment, since the metal portion 32 of the holder 14 to which the camera module 2 is fixed on the inner periphery is formed into a square cylindrical shape, and is formed of a magnetic material, the metal portion 32 also plays a magnetic shielding function for the camera module 2.

In the present embodiment, both ends of the resin portion 33 in the optical axis direction are disposed outside in the optical axis direction with respect to both ends of the metal portion 32 in the optical axis direction. Therefore, in the present embodiment, when the holder 14 moves excessively in the optical axis direction due to application of an impact such as, for example, dropping to the optical unit 1, it becomes possible to prevent the metal portion 32 from contacting another component constituting the optical unit 1. Thus, in the present embodiment, it becomes possible to prevent damage of another component when the holder 14 moves excessively in the optical axis direction.

In the present embodiment, an outer end of the resin portion 33 in the radial direction of the holder 14 is disposed outside in the radial direction of the holder 14 with respect to an outer end of the metal portion 32 in the radial direction of the holder 14. Therefore, in the present embodiment, when the holder 14 moves excessively in the radial direction due to application of an impact such as, for example, dropping to the optical unit 1, it becomes possible to prevent the metal portion 32 from contacting the case body 17 made of resin. Thus, in the present embodiment, it becomes possible to prevent damage of the case body 17 when the holder 14 moves excessively in the radial direction, and it becomes possible to prevent generation of dust resulting from contact of the metal portion 32 with the case body 17.

OTHER EMBODIMENT

The above-described embodiment is one example of a preferred embodiment according to the present invention. However, the embodiment is not limited to the above, and various modifications can be implemented within a range that does not deviate from the gist of the present invention.

In the embodiment described above, the holder 14 is formed by fixing the separately formed first holder portion 35 and second holder portion 36 to each other. Alternatively, the entirety of the holder 14 may be formed as a single unit by insert molding. However, in a case where the entirety of the frame-shaped holder 14 is formed as a single unit by insert molding, when the two arm portions 4b are disposed on the inner periphery of the holder 14, it is necessary to dispose the two arm portions 4b on the inner periphery of the holder 14 in a state that the arm portions 4b are elastically deformed up to the inner periphery of the holder 14. Therefore, as the optical unit 1 is downsized, and the holder 14 and the intermediate member 4 are downsized, it becomes difficult to dispose the two arm portions 4b on the inner periphery of the holder 14.

In contrast, as in the embodiment described above, in a case where the holder 14 is formed by fixing the separately formed first holder portion 35 and second holder portion 36 to each other, as described above, fixing the first holder portion 35 and the second holder portion 36 to each other in a state that the two arm portions 4b are disposed between the separately formed first holder portion 35 and second holder portion 36 makes it possible to dispose the two arm portions 4b on the inner periphery of the holder 14. Therefore, it becomes easy to dispose the two arm portions 4b on the inner periphery of the holder 14.

In the embodiment described above, the magnet fixing portion 32a, the magnet fixing portion 32b, and the spherical body contact portion 32c may be formed separately. However, as in the embodiment described above, in a case where the magnet fixing portion 32a, the magnet fixing portion 32b, and the spherical body contact portion 32c are formed into one unit, it becomes easy to handle a component when manufacturing the holder 14. Also, in the embodiment described above, the metal portion 32 may be structured of the magnet fixing portions 32a, 32b, and the spherical body contact portions 32c and 32d. In this case, the magnet fixing portion 32a, the magnet fixing portion 32b, the spherical body contact portion 32c, and the spherical body contact portion 32d are formed separately, and the metal portion 32 is not formed into a cylindrical shape. Also, in this case, the magnet fixing portions 32a and 32b are formed of a magnetic material, but the spherical body contact portions 32c and 32d may be formed of a non-magnetic material.

In the embodiment described above, the spherical body 21 may be fixed to the tip end portion 4d of the arm portion 4b. In this case, the spherical body 21 is not fixed to the spherical body contact portions 32c and 32d. Also, in this case, for example, a concave portion in which a part of the spherical body 21 is disposed is formed in the spherical body contact portions 32c and 32d, and the spherical body 21 is in contact with the concave portion from the inside in the first crossing direction. Further, in the embodiment described above, the spherical body 23 may be fixed to the tip end portion 4f of the arm portion 4c. In this case, the spherical body 23 is not fixed to the support member 22. Also, a concave portion in which a part of the spherical body 23 is disposed is formed in the support member 22, and the spherical body 23 is in contact with the concave portion from the inside in the second crossing direction.

In the embodiment described above, the driving magnet 24 may be fixed to a right surface of the holder 14. In this case, a part of a right side portion of the holder 14 serves as the magnet fixing portion 32a, and the driving coil 25 is disposed in a through-hole formed in a right surface portion of the case body 17. Further, in the embodiment described above, the driving magnet 26 may be fixed to a front surface of the holder 14. In this case, a part of a front side portion of the holder 14 serves as the magnet fixing portion 32b, and the driving coil 27 is disposed in a through-hole formed in a front surface portion of the case body 17. In this way, in the embodiment described above, the spherical body contact portion 32*c* may not be disposed between the magnet fixing portion 32*a* and the magnet fixing portion 32*b* in a peripheral direction of the holder 14.

In the embodiment described above, the optical unit 1 may include a pivotal movement mechanism that pivotally moves the camera module 2 with respect to the intermediate member 4 around the optical axis L of the camera module 2, as a center of pivotal movement. In this case, the intermediate member 4 may include a first intermediate member and a second intermediate member. The movable body 3 is pivotally movable with respect to the first intermediate member around the optical axis L of the camera module 2, as a center of pivotal movement, and the first intermediate member is pivotally movable with respect to the second intermediate member around a first axis L1, as a center of pivotal movement.

In the embodiment described above, there may be a portion of the metal portion 32 that is disposed outside in the optical axis direction with respect to both ends of the resin portion 33 in the optical axis direction. Also, in the embodiment described above, there may be a portion of the metal portion 32 that is disposed outside in the radial direction of the holder 14 with respect to an outer end of the resin portion 33 in the radial direction of the holder 14. Further, in the embodiment described above, the two arm portions 4*b* may be disposed on the outer periphery of the holder 14.

In the embodiment described above, an outer shape of the holder 14 when viewed from the optical axis direction may be a rectangular shape. Also, in the embodiment described above, the first crossing direction (V direction) may not be orthogonal to the optical axis L, and the second crossing direction (W direction) may not be orthogonal to the first crossing direction. Also, in the embodiment described above, the optical unit 1 may be mounted in various devices other than a mobile device.

What is claimed is:

1. An optical unit with a shake correction function, comprising:
    a movable body including a camera module;
    an intermediate member, configured to hold the movable body to be pivotally movable;
    a fixed body, configured to hold the intermediate member to be pivotally movable;
    a magnet drive mechanism, configured to pivotally move the movable body with respect to the fixed body, so that an optical axis of the camera module is inclined in any direction;
    a first fulcrum portion, configured to serve as a fulcrum for pivotal movement of the movable body with respect to the intermediate member; and
    a second fulcrum portion, configured to serve as a fulcrum for pivotal movement of the intermediate member with respect to the fixed body,
    wherein the movable body is configured to be pivotally movable with respect to the intermediate member around a first crossing direction intersecting an optical axis of the camera module, as an axis direction in pivotal movement;
    the intermediate member is configured to be pivotally movable with respect to the fixed body around a second crossing direction intersecting the first crossing direction and intersecting an optical axis of the camera module, as an axis direction in pivotal movement;
    the first fulcrum portion is disposed at both ends of the intermediate member in the first crossing direction;
    the movable body including a frame-shaped holder to which the camera module is fixed on an inner periphery;
    the intermediate member including two arm portions constituting end portions of the intermediate member in the first crossing direction;
    the magnet drive mechanism including a driving magnet being fixed to the holder and a driving coil being fixed to the fixed body;
    the first fulcrum portion including a spherical body disposed between the arm portion and the holder;
    the holder is structured of a metal portion formed of a metal material, and a resin portion formed of a resin material being integrated with the metal portion by insert molding; and
    the metal portion including: a magnet fixing portion formed of a magnetic material, to which the driving magnet is fixed, and a spherical body contact portion in contact with the spherical body.

2. The optical unit with a shake correction function according to claim 1, wherein
    both ends of the resin portion in an optical axis direction being a direction of an optical axis of the camera module are disposed outside in the optical axis direction with respect to both ends of the metal portion in the optical axis direction.

3. The optical unit with a shake correction function according to claim 1, wherein
    an outer end of the resin portion in a radial direction of the holder orthogonal to an optical axis direction being a direction of an optical axis of the camera module is disposed outside of the holder in the radial direction, with respect to an outer end of the metal portion in the radial direction of the holder.

4. The optical unit with a shake correction function according to claim 1, wherein
    an outer shape of the holder, when viewed from an optical axis direction being a direction of an optical axis of the camera module, is a square shape or a rectangular shape,
    the magnet fixing portion includes two magnet fixing portions disposed on two adjacent sides of four sides of the holder whose outer shape is a square shape or a rectangular shape when viewed from the optical axis direction, and
    the spherical body contact portion includes two spherical body contact portions disposed at two corner portions disposed on one of diagonal lines among four corner portions of the holder whose outer shape is a square shape or a rectangular shape when viewed from the optical axis direction.

5. The optical unit with a shake correction function according to claim 4, wherein
    one of the two spherical body contact portions is disposed between the two magnet fixing portions in a peripheral direction of the holder, and is formed integrally with the two magnet fixing portions.

6. The optical unit with a shake correction function according to claim 4, wherein
    the intermediate member is a plate spring,
    the arm portion is disposed on an inner periphery of the holder, and configured to urge the spherical body toward the holder,
    the holder is structured of a first holder portion and a second holder portion being divided on the other diagonal line where the spherical body contact portion is not disposed, when viewed from the optical axis direction, and the first holder portion and the second holder portion being formed separately are fixed to each other.

* * * * *